United States Patent [19]

Grodinsky

[11] 3,739,280

[45] June 12, 1973

[54] CONTROLLED CARRIER AMPLITUDE MODULATED SIGNAL TRANSMITTING AND RECEIVING SYSTEM

[76] Inventor: Robert M. Grodinsky, 448 West Howard Street, Skokie, Ill. 60076

[22] Filed: Dec. 10, 1970

[21] Appl. No.: 96,772

[52] U.S. Cl. ............... 325/144, 325/105, 325/138, 332/31 T, 332/38

[51] Int. Cl. ............................................. H03c 1/62

[58] Field of Search .................. 325/105, 137, 138, 325/144, 182, 187; 330/40, 135, 138, 140; 332/31 T, 37 R, 38, 44, 60, 61

[56] References Cited

UNITED STATES PATENTS

| | | | |
|---|---|---|---|
| 3,626,417 | 12/1971 | Gilbert | 178/66 |
| 3,486,128 | 12/1969 | Lohrmann | 330/40 |
| 3,204,202 | 8/1965 | Battin | 332/37 R X |
| 3,513,406 | 5/1970 | Leuthauser | 325/105 X |
| 3,317,661 | 5/1967 | Dischert et al. | 325/138 X |
| 3,484,723 | 12/1969 | Rypkema | 325/138 X |

*Primary Examiner*—Benedict V. Safourek
*Attorney*—Wallenstein, Spangenberg, Hattis & Strampel

[57] ABSTRACT

An amplitude modulated transmitting and receiving system comprising in combination means for clamping a relatively low frequency modulating signal to a given reference level, so the clamped signal does not vary in polarity, means for chopping the clamped signal between a reference potential at or near said reference level and the instantaneous value of the clamped signal, and filter means for filtering D.C. and modulating signal frequencies from the chopped signal. The filtered signal is transmitted by an antenna and a conventional amplitude modulation receiver receives the transmitted signal.

6 Claims, 14 Drawing Figures

INVENTOR
Robert M. Grodinsky
BY
Wallenstein, Spangenberg, Hattis & Strampel
ATTYS.

INVENTOR
Robert M. Grodinsky

BY
Wallenstein, Spangenberg, Hattis & Strampel
ATTYS.

CONTROLLED CARRIER AMPLITUDE MODULATED SIGNAL TRANSMITTING AND RECEIVING SYSTEM

The invention relates to amplitude modulated signal transmitting and receiving systems.

As is well known, a conventional amplitude modulated signal can be broken down into the sum of a fixed amplitude carrier signal component and two side band signal components including an upper side band component having a frequency which exceeds the carrier frequency by the modulating signal frequency and whose amplitude is proportional to the amplitude of the modulating signal, and a lower side band component having a frequency which is lower than the carrier frequency by the amount of the modulating signal frequency and whose amplitude is proportional to the amplitude of the modulating signal. In the conventional amplitude modulation radio transmitting system, all the signal components are transmitted. In such a system, most of the power is used to transmit the carrier signal which is continuously generated even when the modulating signal is absent or is of low amplitude. This resulting waste of power is especially unsatisfactory in battery operated transmitting systems. In a less conventional but well known amplitude modulating radio transmitting system, to improve transmission efficiency the carrier component or the carrier and one side band component are removed.

The removal of the carrier signal or the carrier signal and one side band component reduces the amount of power necessary to transmit information contained in the modulating signal and thus increases transmission efficiency. When the carrier signal component and one side band signal component are eliminated, the maximum efficiency is realized, but reception of the single side band signal requires reinsertion of the carrier signal at the receiver, which makes the receiver more expensive and complicated than conventional amplitude modulation receivers. If only the carrier signal is removed, the efficiency is again improved but reception is even more difficult requiring exact phase control of the reinsertion of the carrier signal.

The inefficiency inherent in amplitude modulating systems which do not eliminate the carrier signal and which therefore can use the less complicated conventional amplitude modulation receiver, can be greatly improved by controlling the amplitude of the carrier signal so the carrier signal amplitude is small or nonexistent where there is no modulating signal and is proportionately large during the presence of a modulating signal. The present invention provides such a controlled carrier signal amplitude modulation system through very simple and unique circuitry.

The various features and advantages of the invention will become apparent upon making reference to the specification to follow, the claims and the drawings wherein:

FIGS. 1A and 1B are conventional amplitude modulation waveforms respectively for relatively high and relatively low amplitude modulating signals;

FIGS. 2A and 2B respectively show the amplitude modulation waveforms produced by the circuit or the present invention respectively for relatively high and low amplitude modulating signals;

FIGS. 3A and 3B respectively show vector diagrams which illustrate the manner in which the waveforms 2A and 2B could be generated;

Figures 1, 1A, 2A, 2B, 3A, 3B:
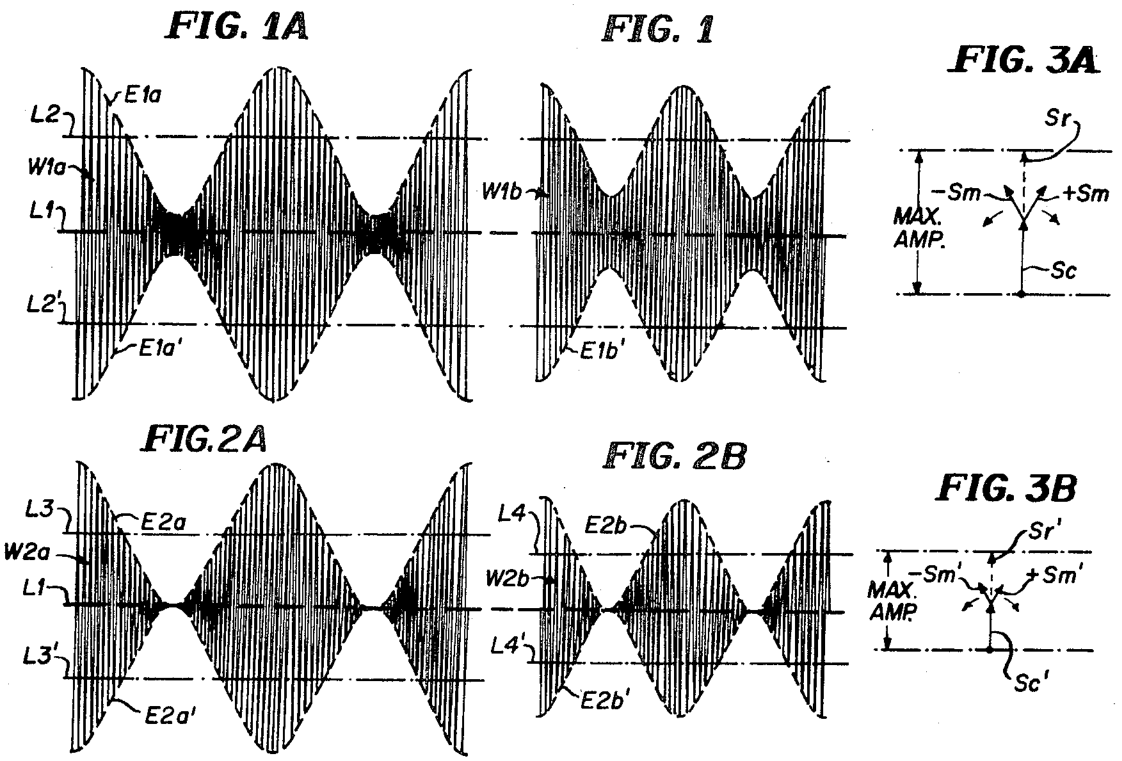

Refer now to FIG. 1A which shows a conventional amplitude modulation waveform W1*a* comprising a signal of a carrier frequency having an amplitude which varies with respect to a zero axis line L1. The positive portions of the waveform W1*a* have an envelope E1*a* and the negative portions of the waveform W1*a* have an envelope E1*a'*. The average value of the upper positive envelope E1a is shown by a line L2 and the average value for the lower negative envelope E1*a'* is shown by a line L2'. The upper and lower envelopes E1*a* and E1*a'* follow the modulating signal. FIG. 1B shows the conventional amplitude modulation waveform W1*b* where the modulating signal has a reduced amplitude from that shown in FIG. 1A. As shown in FIG. 1B, the upper and lower envelopes E1*b* and E1*b'* have the same average value shown by the lines L2 and L2' as the envelopes E1*a* and E1*a'* in FIG. 1A even through the degree to which the envelopes E1*b* and E1*b'* go above and below the average value lines is smaller than that of the envelopes E1*a* and E1*a'*. It can thus be seen that where the modulating signals disappear, the carrier signals will be of constant in amplitude varying between the lines L2 and L2'. It is apparent that in an amplitude modulation system which produces the amplitude modulation waveforms W1*a* and W1*b* of FIGS. 1A and 1B a great deal of power will be wasted for low amplitude modulating signals or when the modulating signals are non-existent.

More efficient amplitude modulation system is provided when the amplitude modulation is modified to that shown in FIGS. 2A and 2B which respectively show modified amplitude modulation waveforms W2*a* and W2*b* of modulating signals which respectively have the same relatively large and small amplitudes as the modulating signals producing the waveforms of FIGS. 1A and 1B. In the amplitude modulation waveforms W2*a* and W2*b*, the average values of the upper and lower envelopes E2*a*–E2*b* and the E2*a*–E2*b'* respectively vary in accordance with the amplitudes of the modulating signal. Thus, in FIG. 2A, lines L3 and L3', which represent the average values of the upper and lower envelopes E2*a* and E2*a'* of the waveform W2*a* are positioned a substantial distance from the zero line L1. In FIG. 2B, the average values of the upper and lower envelopes E2*b* and E2*b'* of the waveform W2*b* have average values represented by the lines L4 and L4' whose positions are closer to the zero line L1 in proportion to the amplitudes of the envelopes. Thus, when the modulating signals disappear or are near zero, it can be seen that the carrier signals will be non-existent or near zero so that little or no power will be generated when the modulating signals are near zero or are non-existent, thereby preserving power and increasing the efficiency of the modulation system.

The conventional amplitude modulation waveforms L1*a* and W1*b* shown in FIGS. 1A and 1B can be broken down into a carrier signal component of fixed amplitude and upper and lower side band components which have amplitudes proportional to the amplitude of the modulating signal and frequencies which respectively exceed and fall short of the carrier frequency by the amount of the modulation frequency.

FIG. 3A and 3B respectively represent vector diagrams of the signal components making up the amplitude modulation waveforms W2*a* and W2*b* of FIGS. 2A and 2B. The vector S*c* represents the fixed stationary amplitude carrier signal component and the vectors +S*m* and −S*m* respectively are vectors which rotate respectively clockwise and counterclockwise with respect to the stationary vector S*c* and represent the upper and lower side band components of the waveform W2*a* whose amplitudes vary in proportion to the amplitude of the modulating signal and whose frequencies respectively exceed and fall short of the carrier frequency by the amount of the modulating frequency. The modulation signal vectors +S*m* and −S*m* have amplitudes proportional to the amplitude of the modulating signal. It can be seen that when these vectors are added in time to the carrier vector S*c*, the resultant vector S*r* will vary in amplitude in accordance with the envelopes E2*a* or E2*a*′ of the waveform W2*a*. In FIG. 3B, the stationary carrier vector S*c*′ shown therein is smaller than the carrier vector S*c* in FIG. 3A in proportion to the smaller amplitude of the modulating signal represented by the upper and lower sideband vectors +S*m*′ and −S*m*′ which respectively move clockwise and counterclockwise with respect thereto. The addition of the vectors S*c*′, +S*m*′ and −S*m*′ will produce a resultant vector S*r*′ whose amplitude varies in accordance with that of the envelopes E2*b* or E2*b*′ in FIG. 2B.

Figure 4:
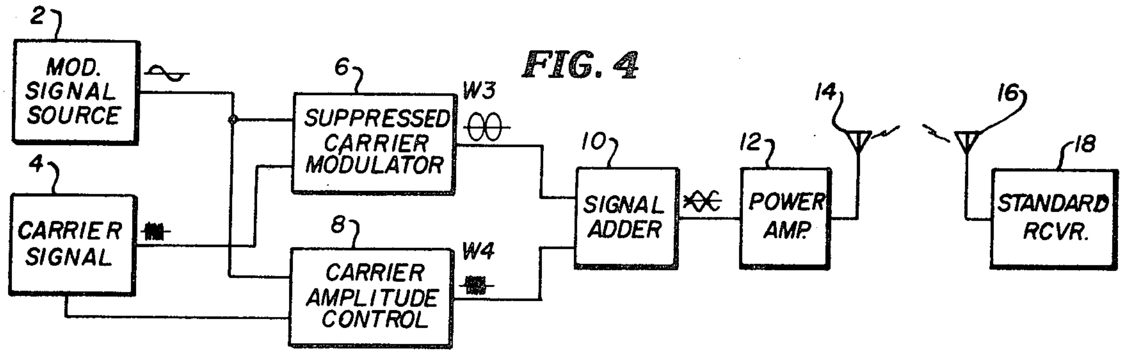
FIG. 4 is a block diagram of a circuit which produces the waveforms of FIGS. 2A and 2B in the manner indicated by the vector diagrams of FIGS. 3A and 3B.

FIG. 4 is a block diagram of a circuit which can produce the modified amplitude modulation waveforms W2*a* or W2*b* of FIGS. 2A or 2B. As there shown, a source 2 of a modulating signal and a source 4 of a carrier signal are respectively fed to a suppressed carrier modulator circuit 6 which operates in a conventional way to provide a suppressed carrier signal waveform W3 which consists of upper and lower side band components as previously described but with the carrier signal component removed. The output of the carrier signal source 4 is also fed to a carrier amplitude control circuit 8 which produces at the output thereof a carrier signal W4 at the carrier frequency which has an amplitude proportional to the amplitude of the output of the modulating signal 2. (Such a circuit, for example, can include means for producing a D. C. signal proportional to the amplitude of the modulating signal, and an amplifying circuit whose gain is controlled by the magnitude of the D.C. signal). The outputs W3 and W4 of the suppressed carrier modulator circuit 6 and the carrier amplitude control circuit 8 can then be fed to a suitable adder or mixer circuit 10 which, in turn, is fed to a suitable power amplifier 12 extending to a transmitting antenna 14. The transmitted signal is picked up by receiving antenna 16 and fed to a standard receiver 18 which may be designed to receive a conventional amplitude modulation signal.

Figure 5:
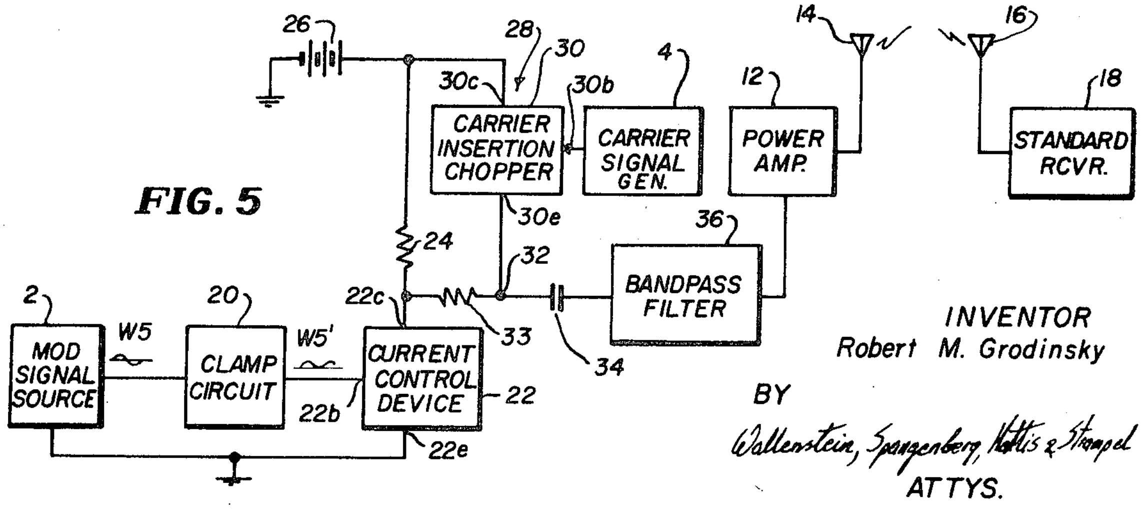
FIG. 5 is a block diagram of the preferred circuit of the invention which produces the amplitude modulation waveforms of FIGS. 2A and 2B.
Figure 6A:
FIGS. 6A, 6B, 6C, 6D and 6E illustrate various signal waveforms in the circuit of FIG. 5.
Figure 6B:
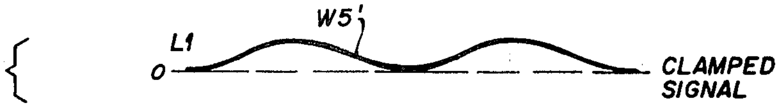

Refer now to FIG. 5, which shows the most advantageous manner of producing the modified amplitude modulation of FIGS. 2A and 2B. The waveform W5 of the output of the modulating signal source 2 (see also FIG. 6A) varies above and below the zero reference line L1. This output may be fed to a conventional clamping circuit 20 which clamps the waveform W5 most advantageously to a point at or near the cut-off voltage for an associated current control device 22 which is most desirably a transistor which is cut off (i.e., non-conductive) when the base to emitter voltage is zero. Therefore, in such a case, the modulating signal is clamped at or near zero voltage, as shown in FIG. 6B. This clamped voltage waveform W5′ is fed to the control terminal **22*b* of the current control device 22 which is biased at or near its non-conductive state to form a part of a single-ended Class B amplifier circuit. The combination of a single-ended Class B amplifier with a clamping circuit feeding the same, where the clamping circuit clamps the signal to be amplified to the voltage level at which the current control device involved is non-conductive, is a unique circuit combination which forms a very efficient linear amplifier since there is little or no power consumption under low or no signal output conditions. The polarity of the clamped waveform W5′ is such as to drive the current control device 22 into its more conductive state so that the average value of the load current flowing through the load terminals 22*c* and 22*e*** thereof varies with the average value of the clamped waveform W5′.

The load terminal **22*c* of the current control device 22 is shown connected through a resistor 24 to one of the terminals of a source of D.C. voltage 26 whose opposite terminal is grounded. On the assumption that the ungrounded terminal of the source of D.C. voltage is a positive (B+) voltage (i.e., it could be a negative voltage), in the absence of chopper circuitry to be described, the amplified signal at the load terminal 22*c* of the current control device 22 will be clamped to the aforementioned B+ positive voltage level as shown by the waveform W5″ shown in FIGS. 6C in solid lines. In the absence of the chopper circuitry, the voltage at the load terminal 22*c* would thus be a constant B+ voltage in the absence of the modulating signal and would be a waveform under signal input conditions which varies between the B+ voltage level and some lower level depending on the amplitude of the clamped input signal W5′. (Since the output of the current control device 22** is an amplifier clamped signal, the single-ended Class B amplifier circuit described can be considered a part of an overall clamping circuit).

The output of the current control device 22 is most advantageously fed to a chopper modulator circuit generally indicated by reference numeral 28 which includes a carrier insertion or chopper current control device 30 which may be a transistor. A resistor 33 is shown connected between the load terminal **22*c* of the amplifier current control device 22 and the load terminal 30*e* of the chopper current control device 30. The other load terminal 30*c* of the chopper current control device 30 is connected to the positive or ungrounded terminal of the source of D.C. voltage 26. The control terminal 30*b* of the chopper current control device 30 is connected to the output of the carrier signal generator 4. The output of the carrier signal generator 4 renders the load terminals of the chopper current control device 30 alternately conductive and non-conductive at the carrier frequency rate. It can be shown that the waveform at the juncture 32 between the resistor 33 and the load terminal 30*e* of the chopper current control device 30 is the waveform W6 shown in FIG. 6**D, which is a waveform which alternately varies at the carrier frequency rate between the B+ level and the instantaneous value of the waveform W5'' in FIG. 6C. This waveform W6 at the terminal 32 is then fed to a series of filters one of which is a D.C. filter, such as capacitor 34, which removes the D.C. component from the waveform W6 and to a band pass filter 36 which removes the low modulating signal frequency from the waveform W6 and also, most advantageously, frequencies greatly in excess of the carrier and side band frequencies to eliminate the square wave components from the waveform to produce the ultimate desired modulating waveform signal W1 shown in FIG. 6E.

Figure 6C:
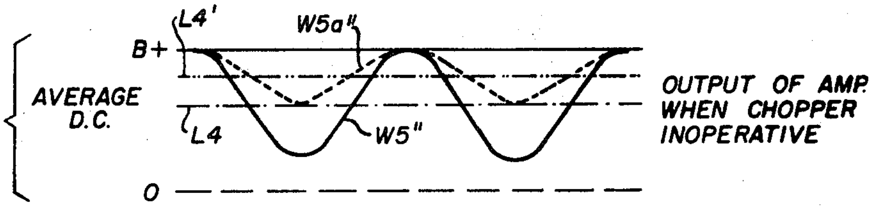
Figure 6D:
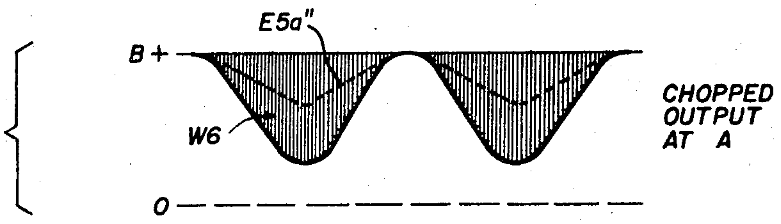
Figure 6E:
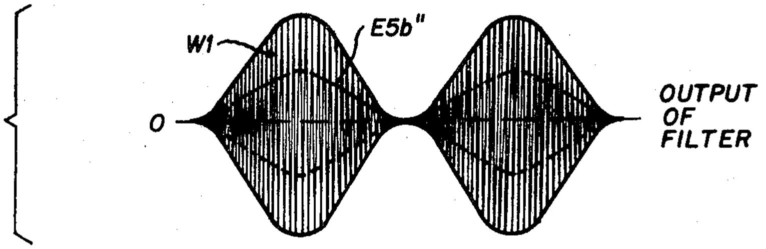

Superimposed on the signal waveforms shown W5'', W6 and W1 in FIG. 6C, 6D, and 6E respectively are waveforms W5*a*'' (whose average value is indicated by reference line L4') and envelopes E5*a*'' and E5*b*'' respectively which indicate the envelopes of the waveforms having about one-half the amplitude of the previously described waveforms.

Figure 7:
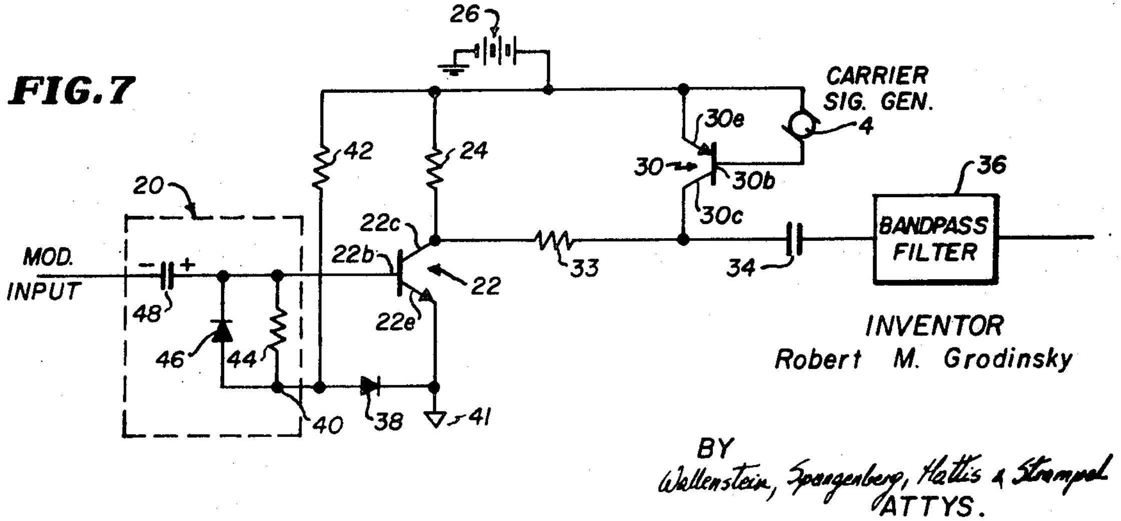
FIG. 7 is the most preferred circuit for the block diagram circuit of FIG. 5.

FIG. 7 shows the preferred circuitry for the block diagram circuit of FIG. 5. In FIG. 7 the current control device 22 is a transistor where load current flow will normally be zero when the net emitter to base voltage is zero (unlike vacuum tube current control devices where there is substantial current flow when the grid to cathode voltage is zero). In FIG. 7, a biasing circuit is provided for the purpose of supplying a small degree of initial conduction so that, in the absence of a modulating signal source, there will be a small carrier signal generated to operate as an automatic gain control signal at the receiver 18 to reduce the gain thereof during the temporary absence of a modulating signal to minimize background noise. This biasing circuit includes a diode 38 connected between a terminal 40 of the clamping circuit 20 and ground 41. The resistor 42 is connected between the terminal 40 and the ungrounded terminal of the source of D.C. voltage 26. The diode 38 is a forward-biased diode which develops a fixed bias coupled to the control terminal 22*b* of the transistor 22 through the parallel circuit of a resistor 44 and a diode 46 forming part of the clamping circuit 20. The clamping circuit 20 further includes an input capacitor 48 which extends to the output of the modulating signal source 2. The capacitor 48 and the diode 46 clamps the input signal to the voltage drop across the bias circuit diode 38. The capacitor 48, due to the conduction of the diode 46 of a negative going voltage, will quickly charge up to the peak negative value of the input signal, leaving the diode 46 nonconductive so that the signal at the right plate of the capacitor 48 will effectively be the sum of the peak negative voltage which remains on the capacitor 48 and the instantaneous value of the input signal which produces the clamped waveform W5' shown in FIG. 6B.

It is apparent that the present invention has provided an exceedingly simple system for providing the amplitude modulation waveform illustrated in FIG. 6E resulting in maximum efficiency of the equipment involved.

It should be understood that numerous modifications may be made in the most preferred form of the invention described without deviating from the broader aspects of the invention.

I claim:

1. An amplitude modulation system comprising, in combination: clamping means responsive to the modulating signal for referencing one peak of said modulating signal to a given D.C. reference level without eliminating any portion of the signal and so the resultant signal does not alternate in polarity, means for chopping said D.C. referencedmodulating signal at the carrier frequency between said D.C. reference level and the instantaneous value of the modulating signal, and filtering means for filtering D.C. and the modulating signal frequencies from the chopped signal to provide at the output thereof said desired amplitude modulated signal.

2. The amplitude modulation system of claim 1 wherein said filter means also filters out all frequencies substantially in excess of the carrier signal frequency.

3. The amplitude modulation system of claim 1 wherein said clamping means includes an amplifier including a signal amplifying current control device having a pair of load terminals coupled to said chopping means and a control terminal, and a clamping circuit for clamping the modulating signal to a point at or near a control voltage level at which conduction through the load terminals of said current control device is reduced to zero, and said control terminals of said current control device being coupled to the output of said clamping circuit so the average current flowing through said load terminals is proportional to the amplitude of the clamped modulating signal and the instantaneous value thereof is proportional to the instantaneous value of the clamped modulating signal.

4. The amplitude modulation system of claim 3 wherein said chopper circuit is a circuit driven by the carrier signal and coupled in series with the load terminals of the current control device of said single-ended Class B amplifier.

5. An amplitude modulation system comprising: a source of a relatively low frequency modulating signal, a source of a relatively high frequency carrier signal, D.C. clamping means for shifting said modulating signal to provide a resultant modulating signal including all portions of the original signal and which does not alternate in polarity, a modulator circuit responsive to said shifted modulating signal and to said carrier signal to provide a resultant amplitude modulated signal which is or resembles the shifted modulating signal chopped at the carrier signal rate, filter means for removing D.C. and the modulating frequencies from said resultant amplitude modulated signal, and means for transmitting said filtered signal to a remote point.

6. A linear amplifier circuit comprising: a signal amplifying current control device having a pair of load terminals and a control terminal, a source of D.C. voltage, circuit completing means coupled to said terminals and to said source of D.C. voltage for forming a linear amplifier circuit wherein the current flow through said load terminals is cut-off when the voltage applied across said control terminal and the other load terminal is at or near a given cutoff voltage, a source of a signal to be amplified, and a clamping circuit coupled between said signal source and the control terminal of said current control device for clamping the signal from said signal source so the resultant voltage applied between said control terminal and other load terminal of said current control device is clamped to said given cutoff voltage without elimination of any portion of the signal and varies from the clamped level in a direction to effect current flow through the load terminals of said current control device.

* * * * *